United States Patent [19]
Kosikowski et al.

[11] Patent Number: 4,689,245
[45] Date of Patent: Aug. 25, 1987

[54] LOW-FAT DAIRY COFFEE WHITENER

[75] Inventors: Frank V. Kosikowski, Ithaca, N.Y.; Rafael Jimenez-Flores, Davis, Calif.

[73] Assignee: Cornell Research Foundation, Ithaca, N.Y.

[21] Appl. No.: 736,315

[22] Filed: May 21, 1985

[51] Int. Cl.$^4$ .............. A23C 11/10; A23C 9/142; A23C 1/272
[52] U.S. Cl. ................................ 426/72; 426/580; 426/657
[58] Field of Search ............ 426/73, 580, 588, 657, 426/72

[56] References Cited

U.S. PATENT DOCUMENTS

| | | | |
|---|---|---|---|
| 3,963,837 | 6/1976 | Maubois et al. | 426/491 X |
| 4,205,090 | 5/1980 | Maubois et al. | 426/491 X |
| 4,251,550 | 2/1981 | Proctor | 426/72 |
| 4,355,048 | 10/1982 | Schaap et al. | 426/491 X |
| 4,515,815 | 5/1985 | Kosikowski et al. | 426/491 X |

FOREIGN PATENT DOCUMENTS 2484204 12/1981 France .......................... 426/580

OTHER PUBLICATIONS

Lampert, L. M., "Modern Dairy Products", Chemical Publ. Co., Inc., N.Y., 1965, pp. 68–71.

Primary Examiner—Robert Yoncoskie
Attorney, Agent, or Firm—Ralph R. Barnard

[57] ABSTRACT

A coffee whitener composition made from decreamed milk ultrafiltration retentate having its protein concentrated between about 2:1 to about 4:1 compared to the protein content of the starting milk and a minor whitening power enhancing amount is added in the form of riboflavin (a vitamin) and beta carotene (a vitamin precursor) or a mixture thereof. The composition is usually in powdered form and is high in protein, low in fat and sodium and reduced in lactose and its high protein enhanced as described provided a low-fat dairy coffee whitening function approximately equal to non-dairy coffee creamers.

7 Claims, 3 Drawing Figures

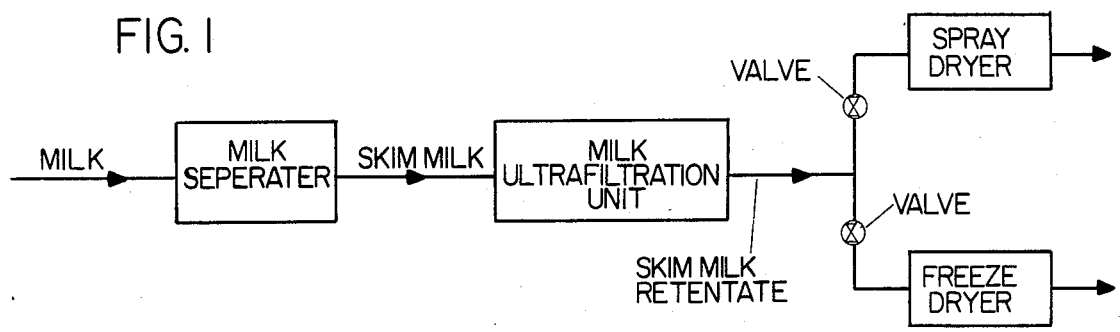
FIG. 1
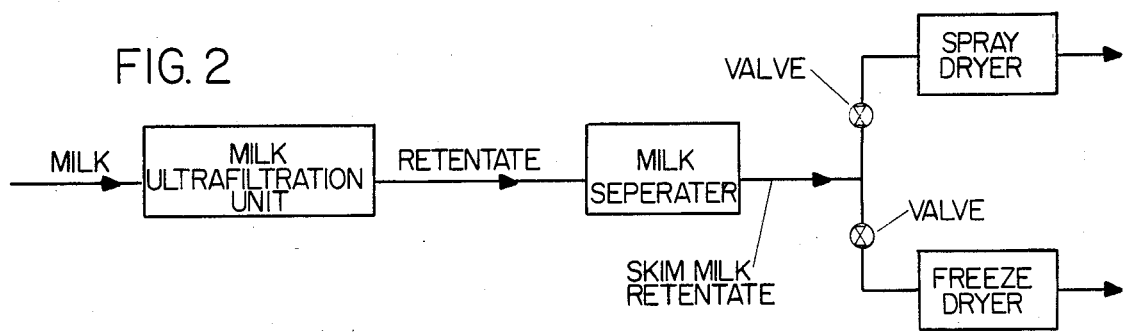
FIG. 2
FIG. 3
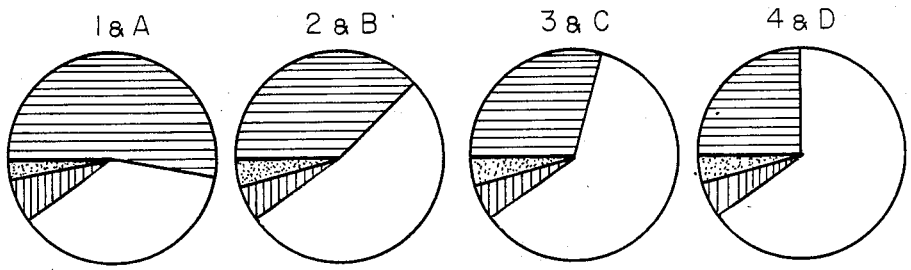
COMPOSITION OF ULTRAFILTERED RETENTATE POWDER
| 1 & A | 2 & B | | 3 & C | 4 & D |
|---|---|---|---|---|
| 35.68 | 49.79 | PROTEIN % | 56.38 | 64.35 |
| 53.06 | 37.50 | LACTOSE % | 31.37 | 23.45 |
| 7.73 | 7.64 | ASH % | 7.80 | 7.74 |
| 3.55 | 4.53 | MOISTURE % | 3.93 | 3.94 |
| 0.50 | 0.53 | FAT % | 0.51 | 0.50 |
| 1.30 | 1.70 | CALCIUM % | 1.92 | 2.08 |
| 44 | 35 | SODIUM MG/100G | 27.5 | 22.5 |

4,689,245

LOW-FAT DAIRY COFFEE WHITENER

Skimmilk and powder forms heretofore generally have not been used as a coffee whiteners mostly because of there limitations relating to color, taste, dispersibility, etc. Non-dairy coffee creamers (NDCC) in both liquid and powdered form have become popular. This invention relates to a new and improved low-fat dairy coffee whitener product made from ultrafiltered skimmilk retentates which also has a reduced lactose content, a high protein content, a high calicum content, low sodium content and provides substantially the same coloring in coffee as the non-dairy creamer, as well as acceptable dispersal characteristics when applied in powdered form. Unlike skimmilk in liquid or powdered form, the ultrafiltered skimmilk retentates also provide the same pH shifting function accomplished by the non-dairy creamers.

It was reported by L. M. Lampert in 1970 ("Modern Dairy Products", *Chemical Publishing Co. Inc.*, New York, N.Y., pp 397–408) that non-dairy coffee creamers (NDCC) are composed mainly of corn syrup solids and vegetable fats. R. C. Jolly and F. V. Kosikowski in 1974 reported in an article entitled "Fat Characteristics of Non-dairy and Dairy Powdered Creamers" *J. Agric. Food Chemical* 22(2): 295, that the fatty acids of four brands of commercial NDCC were highly saturated, 95 to 97.8%.

The L. M. Lampert publication reports that the non-dairy coffee creamers (NDCC) often include approximately 37–51% vegetable fat, 41–46% corn syrup solids, 1.3–2.3% stabilizer, 4.6–9.2% sodium cascinate, 1.16–1.80% sodium or potassium phosphates, 1.0–1.80% emulsifiers and also a total of 150 milligrams of sodium/100 grams of creamer. Thus, the non-dairy coffee creamers (NDCC) in liquid or dry form do not have the same high nutritional qualities as in milk products.

Milk ultrafiltration has made possible new processes for the production of some cheese and fermented milks.

Ultrafiltration (UF) in combination with mechanical milk separation can produce skimmilk retentates that when dried, display different composition and physical properties and higher nutritional value than that of standard skimmilk powders, and at the same time when properly formulated function as low-fat dairy coffee whiteners with qualities substantially equal to a non-dairy coffee creamer (NDCC) of the type widely used in this country.

BRIEF DESCRIPTION OF THE FIGURES

FIG. 1 illustrates the production of ultrafiltration skimmilk retentate when the mechanical milk separation step occurs prior to the ultrafiltration concentration step.

FIG. 2 illustrates the production of ultrafiltered skimmilk retentate when the milk is first ultrafiltrated by a conventional ultrafiltration unit, and then the retentate is run through a conventional mechanical milk separator.

FIG. 3 shows pie charts for the composition of powder made from evaporated skimmilk, as well as ultrafiltered skimmilK retentate, at concentrations of 2:1, 3:1 and 4:1 wherein the powder is made using either of two different approaches, one characterized as spray drying and the other characterized as freeze drying.

DESCRIPTION OF THE INVENTION

As used herein the phrase low-fat dairy coffee whitener and non-fat dairy coffee whitener are synonymous signifying about 0.5% or less of fat in the dairy coffee whitener.

This invention relates to a process and composition for the production of a dairy product based, low-fat coffee whitener. The composition comprises a retentate producte by the ultrafiltration of milk, which has had its cream removed and which has been augmented by the addition of minor whitening power enhancing amounts of a whitening power contributing vitamin or vitamin precursor.

The ultrafiltration process employed to provide the composition of this invention is one wherein the ultrafiltration membrane passes water, lactose and other soluble milk components but retains milk proteins and fats.

The cream can be removed from the milk employed to form the compositions of this invention either prior or subsequent to the ultrafiltration concentration step; that is conventional skimmilk may be ultrafiltered or whole milk may be ultrafiltered and the resulting retentate then subjected to a cream preparation process to provide the retentate employed herein.

The whitening power contributing vitamin or vitamin precursor is employed in minor effective amounts, usually in the range of about 40 mg to about 5 mg per 100 grams of retentate solids (i.e. dried composition) with the norm being between 10–20 mg per 100 grams of retentate dry power. The preferred additives are riboflavin, beta carotene or a mixture thereof.

Combining milk ultrafiltration with 2:1 to 4:1 concentrations with mechanical milk separation (in either order) has made possible the production of completely new products based on milk proteins in the form of ultrafiltrated skimmilk retentate. The high and stable pH in the range of 6.5–6.8 of ultrafiltrated skimmilk retentate makes possible for the first time dairy coffee whiteners which will appropriately adjust the pH of hot coffee. The high protein content of the skimmilk retentate along with the addition of riboflavin and/or beta carotene provides a good whitening quality in coffee. Moreover, the ultrafiltrated skimmilk retentate is low in fat and sodium and reduced in lactose. The nutritional quality is good and when the skimmilk retentate is made into a powder it is competitive with the functional quality of a non-dairy coffee creamer as to coloring and the physical properties. The use of a 2:1 to a 4:1 concentration during ultrafiltration is essential, the milk separation step is essential and the addition of riboflavin (a vitamin) and/or beta carotene (a vitamin precursor) is essential.

For the ultrafiltered skimmilk retentates to perform as aforesaid, the concentration of the skimmilk retentate must be in the range of 2×1, 3×1, and 4×1 and the powdered form thereof will have the following range of constituents: about 49–65% of protein, about 23–38% of lactose, about 7.6–7.8% of ash, about 3.9–4.6% of moisture, about 0.50–0.53% of fat, about 1.70–2.08% of calcium and about 22–35 milligrams of sodium in 100 grams of said powder. The non-fat dairy whiteners achieve this whitening affect through the use of milk protein and added riboflavin or beta carotene.

FIGS. 1 and 2 illustrate the two alternate ways of changing the starting milk in two functional steps to skimmilk retentate. In FIG. 1 the mechanical milk separation to form skimmilk takes place first. In FIG. 2 the milk ultrafiltration concentration step takes place first. In both of the cases the concentration of the milk in the ultrafiltration unit is determined by the design of the capacity of the unit. Both batch and continuous processing might be used.

The ultrafiltration unit is of sanitary design of the type now available in the United States, Frances and Denmark and presently used for cheese and other food manufacture. Chapter 5 of a hook entitled "Membrane Filtration: A User's Guide and Reference Manual" authored by Thomas D. Brock and published by *Science Tech., Inc.*, Madison, Wis. (1983), lists various manufacturers of ultrafiltration equipment. The ultrafiltration equipment used to make the present invention was an Abcor 225 unit with HFM membranes of 20,000 daltons manufactured by Abcor, Inc., 850 Main Street, Wilmington, Mass. 01877. In handling large volumes of milk, membrane-type need not be changed in pore size, but the volume handling capabilities of the equipment (membrane surface area and fluid pressure) may well be adjusted as appropriate. The milk product going into the ultrafiltration unit is cycled therethrough at a selected temperature across a membrane either cellulose acetate with polyvinyl chloride backing, or polysulfone, or other acceptable membrane material in a forced turbulent flow. The temperature used depends upon the desired concentration of proteins and fat in the output and the properties of the feed stock. For milk, the temperature is in the range of 52° C. to 54° C. The membranes of the ultrafiltration equipment may take several forms, plates, tubes, hollow fiber or spiral wound, and are mounted for support on stainless steel stands.

The ultrafiltration unit may contain any number of separate and modular membrane sub-units in series or in parallel receiving the milk to be ultrafiltered and each sub-unit may be fed by a separate pump.

The milk separators which would function as required are conventional.

In FIGS. 1 and 2 the valves illustrate that the skimmilk retentate could be dried by either of the alternate methods, spray drying or freeze drying as part of the powder process following conventional techniques.

In a trial approximately 320 liters of freshly drawn, raw Holstein milk from the Cornell University Veterinary farm was heated to 54° C. Three quarters of this milk was ultrafiltered in an Abcor 22S UF unit with 2 m² of polysulfone high flux membranes, possessing a molecular weight cut-off of 20,000 daltons. Inlet and outlet pressures were 310.3 and 103.4 kPa. Three retentate lots at 2:1, 3:1, and 4:1 volume concentrations were produced. A fourth lot of the heated raw milk, serving as a control, was concentrated to 20% total solids in an APV falling film plate evaporator (model J.P.W.). Retentate and evaporated control milk then were mechanically separated in a De Laval (Model 242) separator and pasteurized at 72° C.-15 sec. These lots were split into two portions one of which was spray-dried and the other freeze-dried.

Spray drying was carried out in a Bowen Laboratory Drier Conical Type with an Astronics Micromist nozzle, Model 1701. Inlet and outlet air temperatures were 150° C. and 70° C., respectively, with a feed rate of 150 ml/min. Powder 1 was from evaporated skimmilk, and served as a control while powders 2, 3, and 4 were from UF skimmilk retentates concentrated 2:1, 3:1, and 4:1. The split evaporated milk, A and skimmilk retentates B, C, D, were freeze-dried in a Virtis UE 800 unit. Resulting flakes were milled mechanically. These powders had been analyzed for composition and are compared in the pie charts of FIG. 3.

For comparative purposes a commercial non-dairy coffee creamers (NDCC) was analyzed and reported on in Tables 1 and 2 along with other samples.

Riboflavin (Eastman Kodak reagent) and beta-carotene (Sigma Chemicals) were added to whiteners at 10 mg/100 g powder to enhance color. Riboflavin is a vitamin, beta-carotene is a vitamin precursor.

A Hunterlab Color Difference-meter, Model D25, (Hunter Associates Laboratory, Fairfax, Va.) was used to quantitate whitening capacity and color differences in approximately 80° C. coffee of non-fat skimmilk retentate dairy whiteners and NDCC. Two g of powder were dissolved in 250 ml of a 'standard coffee solution', (4 g of Maxwell House instant coffee in 500 ml hot water). The color analysis was also reported in more detail in the Masters Thesis of Rafael Jimenez-Florez entitled "Physical and Functional Properties of Ultrafiltered Skimmilk Retentate Powder", Cornell University 1984. The Thesis was placed in the Cornell University Library system in Mann Library under Catalog No. TP 372 1984. Also, color photographs were taken of the coffee and appear in FIG. 19 of that Thesis on page 19.

Dispersibility of the powders were measured in 24° C. water by the method described by A. J. Baldwin in 1977 in an article entitled "The Appearance of Whole Milk Powders as Related to Physical Properties" *New Zealand J. of Dairy Sci.* and *Tech.* 12: 201 and numbers recorded in percentage. The pH of the whitened coffee was determined by a Beckman Expandomatic potentiometer.

TABLE 1

Properties of Individual Skimmilk Retentate Powders* in Hot Coffee.

| | Spray Dried[a] Powders | | | | Freeze Dried[a] Powders | | | | Non-dairy Coffee creamer |
|---|---|---|---|---|---|---|---|---|---|
| | 1 | 2 | 3 | 4 | A | B | C | D | Powder Y |
| pH[b] in Hot Coffee | 6.00 | 6.30 | 6.45 | 6.55 | 6.00 | 6.30 | 6.45 | 6.55 | 6.30 |
| Total Color Difference in Hot Coffee | 7.14 | 4.56 | 4.44 | 3.72 | 6.52 | 5.48 | 4.37 | 3.40 | 7.20 |
| Percent Dispersability in 24° C. water | 39 | 18 | 26 | 27 | 34 | 32 | 32 | 33 | 100 |

[a]1 and A produced from skimmilk powder control, 2 and B from 2:1 UF retentate, 3 and C from 3:1 retentate, 4 and D from 4:1 retentate, y = national brand.
[b]Fresh unwhitened coffee pH = 5.30.
Commercial low heat spray-dried skimmilk powder displayed a dispersability value of 37.
*Powders contain no added riboflavin or beta carotene.

TABLE 2

Whitening Capacity Non-Fat Dairy Whiteners C and D in Hot Coffee.

| Whitener Powder | L* | A* | B* | DL | Da | Db | DE | dL | da | db | dE |
|---|---|---|---|---|---|---|---|---|---|---|---|
| C | 46.9 (1.2) | 3.7 (0.1) | 15.3 (0.9) | 46.2 | 4.5 | 25.9 | 49.06 | 1.4 | 0 | 3.5 | 3.77 |
| C + R + B | 47.3 (1.3) | 3.7 (0.1) | 15.7 (0.8) | 45.8 | 4.5 | 16.3 | 48.5 | 1.0 | 0 | 3.1 | 3.26 |
| C + R | 47.1 (1.2) | 3.5 (0.1) | 26.0 (1.0) | 46.0 | 4.3 | 16.6 | 49.1 | 1.2 | 0.2 | 2.8 | 3.05 |
| C + B | 47.3 (1.2) | 3.7 (0.1) | 15.4 (0.9) | 45.8 | 4.5 | 16.0 | 48.7 | 1.0 | 0 | 3.4 | 3.54 |
| D | 48.55 (1.3) | 3.3 (0.1) | 14.6 (1.1) | 44.6 | 4.1 | 15.2 | 47.3 | 0.25 | 0.2 | 4.2 | 4.2 |
| D + R + B | 48.9 (1.2) | 3.1 (0.1) | 15.4 (1.0) | 48.6 | 3.9 | 16.0 | 47.2 | −0.6 | 0.6 | 3.4 | 3.5 |
| D + R | 49.0 (1.2) | 2.8 (0.1) | 15.3 (1.0) | 44.1 | 3.6 | 15.9 | 47.0 | −0.7 | 0.9 | 3.5 | 3.5 |
| D + B | 48.8 (1.4) | 3.2 (0.1) | 14.8 (1.2) | 44.3 | 4.0 | 15.4 | 47.1 | −0.5 | 0.5 | 4.0 | 4.1 |
| White Standard | 93.1 | −0.8 | −0.6 | 0 | 0 | 0 | — | — | — | — | — |
| NDCC | 48.3 | 3.7 | 18.8 | 44.8 | 4.5 | 19.4 | 49.03 | 0 | 0 | 0 | 0 |

*Arithmetic mean of 2 determinations for 4 samples, standard deviation = ( )
L—Lightness, 100 perfect white, 0 perfect black
A—redness
B—yellowness
D—(columns 5-8) Indicates that the difference has been taken from the white standard
d—(columns 9-12) Indicates that the difference is with respect to the NDCC
a—Redness when +, greeness when −, gray when 0
b—Yellowness when +, blueness when −, gray when 0
E—Total color difference
Powders C and D were 3:1 and 4:1 skimmilk retentates respectively.
NDCC—Non Dairy Coffee Creamer
R and B (column 1) = riboflavin and beta-carotene.

Total color difference and pH of hot coffee and dispersibility in water of the powders are shown in Table 1. Non-fat dairy whiteners added to hot, black coffee (pH 5.5) shifted the pH upward to between 6.3–6.55. These values equaled or slightly exceeded those when the same black coffee was colored by a NDCC. Color differences (ΔE) initially of hot coffee containing non-fat dairy whiteners compared against a white standard, were less than those for a skimmilk powder control or NDCC. Value for dispersibility of NDCC in warm 24° C. water was 100%, for non-fat freeze-dried dairy whiteners 32–34% and for non-fat spray-dried dairy witeners 18–27%. Control, powder 1, and a commercial low heat skimmilk powder dispersibility showed values between 34–39%. In hot coffee NDCC dispersed instantaneously whereas non-fat freeze dried coffee whiteners dispersed more slowly but uniformly.

The whitening capacity and color difference of UF skimmilk retentate powders C and D in hot coffee are presented in Table 2. The addition of small amounts of riboflavin or beta-carotene enhanced color quality and equalized to a great extent color differences, eliminating a greyish cast which visually was apparent.

A color photograph, which appears in the aforementioned Thesis and may be inspected at the Cornell University library, shows that commercial low heat spray-dried skimmilk powders compared to non-fat dairy whiteners or non-dairy creamers appear deficient in coffee whitening power. Conversely non-fat dairy whiteners B, C and D and the commercial non-dairy coffee creamer show good whitening power without apparent differences.

Non-fat dairy coffee whitener C contained 0.5% fat, 56.4% protein, 31.4% carbohydrate, 1.9% calcium and 27.5 mg sodium per 100 g. By contrast Lampert in an article entitled "Modern Dairy Products" *Chemical Publishing Co., Inc.,* New York, N.Y., pp. 397–408 (1970) lists a NDCC creamer as containing 37.6% fat, 5.2% protein, 48.1% carbohydrate, 0.02% calcium and 247 mg sodium per 100 g. Three commercial NDCC powders obtained for this study essentially were equal in influencing pH and coffee whitening capacity. Freeze-dried non-fat dairy coffee whitener C was preferree over D because of great opportunity for sedimentation likely to occur at protein levels above 60% and because it is less expensive to produce.

NDCC powders dispersed into coffee immediately. Under the same conditions UF skimmilk retentate non-fat freeze-dried dairy whitener B, C and D dispersed satisfactorily after one spoon rotation. Better dispersion of the spray-dried non-fat dairy whiteners might be attained by more control over variables during commercial drying and by instantizing the powders. The retentate powders C and D containing riboflavin or beta carotene showed in coffee a pH and whitening capacity very similar to commercial NDCC powder. NDCC whitening effects are mainly achieved from fats and artificial colors and those of retentate non-fat dairy whiteners through milk protein and added riboflavin and/or beta carotene.

Preliminary subjective testing here of whitened coffee indicate apparent normal flavor. The low fat dairy coffee whitener of the present invention may be in liquid form.

While the foregoing description of the detailed embodiments of the present invention have been set forth, it will be understood by those skilled in the art that considerable variations may be made in such detail without departing from the spirit of our invention.

I claim:
1. A coffee whitener composition comprising:
   (a) a milk ultrafiltration retentate having its protein concentrated between about 2:1 to about 4:1 compared to the protein content of the starting milk;
   (b) said composition further comprising a minor whitening power enhancing amount of a vitamin or vitamin precursor selected from the group consisiting of riboflavin, carotene and mixtures thereof;

(c) said retentate being the product of the ultrafiltration of either whole milk followed by decreaming or skimmilk wherein the ultrafiltration membrane passes soluble milk components including lactose but retains proteins and fats.

2. The composition of claim 1 wherein skimmilk is ultrafiltered.

3. The composition of claim 1 wherein whole milk is ultrafiltered and the cream is subsequently separated from the retentate to provide the retentate employed in said composition.

4. The composition of claim 1 wherein the composition is dried to a powder.

5. The composition of claim 4 wherein the composition is spray-dried or freezed-dried.

6. The coffee whitener of claim 1 wherein the protein in the skimmilk retentate has been concentrated by ultrafiltration to a ratio of about 3:1.

7. A low fat dairy coffee whitener comprising a skim milk retentate powder made by subjecting whole milk to concentration by ultrafiltration, mechanical separation to remove cream and drying and having the following range of constituents; about 49–65% of total protein, about 23–38% of lactose, about 7.6–7.8% of ash, about 3.9–4.6% of moisture, about 0.50–0.53% of fat, about 1.70–2.08% of calcium and about 22–35 milligrams of sodium in 100 grams of said powder with riboflavin or beta carotene or mixtures thereof added in small amounts sufficient to enhance whiteness thereby eliminating a greyish cast.

* * * * *